(12) United States Patent
Asakura et al.

(10) Patent No.: US 6,903,785 B2
(45) Date of Patent: Jun. 7, 2005

(54) LIQUID CRYSTAL PROJECTOR DEVICE

(75) Inventors: Tsutou Asakura, Kanagawa (JP); Tetsuji Suzuki, Kanagawa (JP); Masaru Kanazawa, Tokyo (JP); Koichi Hamada, Tokyo (JP); Fumio Okano, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 91 days.

(21) Appl. No.: 10/429,955

(22) Filed: May 6, 2003

(65) Prior Publication Data

US 2003/0214635 A1 Nov. 20, 2003

(30) Foreign Application Priority Data

May 8, 2002 (JP) ........................................ 2002-132485

(51) Int. Cl.[7] ........................ G02F 1/1335; G03B 33/12
(52) U.S. Cl. ............................................. 349/8; 353/31
(58) Field of Search ........................... 349/5, 8, 9, 96, 349/106, 117; 353/20, 30, 31, 34; 348/751, 761, 766, 791; 359/485, 487, 494, 497, 498

(56) References Cited

U.S. PATENT DOCUMENTS

| | | | |
|---|---|---|---|
| 6,280,034 B1 * | 8/2001 | Brennesholtz | ............... 353/20 |
| 6,304,302 B1 * | 10/2001 | Huang et al. | ................... 349/9 |
| 6,490,087 B1 * | 12/2002 | Fulkerson et al. | .......... 359/487 |
| 6,636,276 B1 * | 10/2003 | Rosenbluth | .................... 349/8 |
| 6,672,722 B2 * | 1/2004 | O'Connor et al. | ............ 353/34 |

* cited by examiner

*Primary Examiner*—Toan Ton
*Assistant Examiner*—Tai Duong
(74) *Attorney, Agent, or Firm*—Armstrong, Kratz, Quintos, Hanson & Brooks, LLP.

(57) ABSTRACT

In a liquid crystal projector device, a first polarization beam splitter 22 separates an entering green light into first and second green lights perpendicular to each other, and a first liquid crystal element 23 modulates the first green light via a second polarization beam splitter 24. Also, in the device of the present invention, while a first half-wave plate 25 revolves 90 degree a polarized plane of the second light separated by the first polarization beam splitter 22, a second liquid crystal element 26 modulates the second green light via a third polarization beam splitter 27, a second half-wave plate 28 revolves 90 degree a polarized plane of the second light transmitted through the third polarization beam splitter 27, and a fourth polarization beam splitter 29 transmits the first green light transmitted through the second polarization beam splitter 24 and reflects the second green light form the second half-wave plate 28.

6 Claims, 4 Drawing Sheets

LIQUID CRYSTAL PROJECTOR DEVICE

BACKGROUND ARTS

1. Field of the Invention

The present invention relates to a liquid crystal projector device which projects an image having been modulated by a liquid crystal element on a screen.

2. Description of the Related Arts

In conventional, a projector device has been provided, in which a liquid crystal element is used to modulate an image, which is projected on a screen. As such a type of the liquid projector device, those which are configured to modulate three single colored lights including a red (R) light, a green (G) light, and a blue (B) light through modulating elements respectively, has been known.

Here, it has been required to make the image projected on a screen through the liquid crystal projector device to be a high-resolution image, whereby the image is displayed in highly detail. For this reason, attempts have been made (1) to increase a number of the pixels of the liquid crystal element, (2) to construct a multi-display using a plurality of the projector devices and (3) to shift a green (G) pixel to half pixel pitches so that the green pixels are arranged in a doubled manner. The method of shifting a green (G) pixel to half pixel pitches so that the green pixels are arranged in a doubled manner is a method in which the resolution is increased by paying attention to the sensitivity characteristic of the human visibility and is referred to a "dual G system".

To increase a number of the pixels of the liquid crystal element in order to display an image in high detail, the opening rate of the pixel is decreased, which leads to the lacking of the projection brightness. Also, in a reflecting type liquid crystal element, even if a number of the pixels is increased without decreasing the opening rate, since the lights over the entire region of red, green, and blue (RGB) are connected on a screen by one projection lens, the images for these colors are not to be the same in the strict sense due to the magnification chromatic aberration possessed by the projection lens and, thus, a high-resolution image cannot be obtained.

The multi-display construction is the simplest means for increasing a number of the pixels, but it is difficult to connect the multiple of the displays in a smooth manner. In this construction, due to the variation in the brightness, color reproductivity, gamma characteristics of each projector, the image quality in each display becomes different.

In the case where a green (G) pixel is shifted to half pixel pitches so that the green pixels are arranged in a doubled manner, since the lights over the entire region of red, green, and blue are connected on a screen by one projection lens, the images for these colors are not to be the same in the strict sense due to the magnification chromatic aberration possessed by the projection lens and, thus, no image having high resolution can be obtained.

In an optical unit which provides reflecting type liquid crystal elements for RGB, even if a reflecting type liquid crystal element for green is further added to realize a dual G system, a polarization beam splitter for green light for the additional reflecting type liquid crystal element for green light cannot exhibit sufficient performance for separating polarized light. Accordingly, the image injected from the additional reflecting type liquid crystal element for green light cannot have a sufficient contrast ratio.

The present invention is suggested in light of the above situation and the object of the present invention is to provide a liquid crystal projector device, which realizes high resolution and a sufficient contrast ratio.

SUMMARY OF THE INVENTION

The liquid crystal projector device according to the present invention is a liquid crystal projector device which projects an image having been modulated with a liquid crystal element on a screen, and comprises first to fourth polarization beam splitters; first and second half-wave plates, and first and second liquid crystal elements. The first polarization beam splitter separates a green light entering therein into a first and second green lights perpendicular to each other, the first liquid crystal element modulates the first green light, the second polarization beam splitter reflects the first green light having been separated by the first polarization beam splitter to be directed to the first liquid crystal element, and transmits the first green light having been modulated by the first liquid crystal element. The first half-wave plane revolves the polarization plane of the second green light separated by the first polarization beam splitter at 90 degree, the second liquid crystal element modulates the second green light, the third polarization beam splitter reflects the second green light from the second half-wave plate to be directed to the second liquid crystal element and transmits the second green light having been modulated by the second liquid crystal element, the second half-wave plane revolves the polarization plane of the second green light transmitted through the third polarization beam splitter at 90 degree, and the fourth polarization beam splitter transmits the first green light having been transmitted through the second polarization beam splitter and reflects the second green light from the second half wave-plate.

The liquid crystal projector device having such a construction gives first and second green pixels displayed on the screen through the first and second green light at sufficient contrast ratio, respectively.

Preferably, in the liquid crystal projector device according to the present invention, said first and second liquid crystal elements correspond to the green pixels arranged so as to bed shifted to half pixel pitch with each other in the horizontal direction and/or the vertical direction displayed on the screen for projecting the image.

Preferably, the liquid crystal projector device according to the present invention has a liquid crystal element for red and blue lights, which modulates a red light and a blue light, respectively, and the first and second green lights having been modulated by the first and second liquid crystal elements and the red and blue lights having been modulated by the liquid crystal element for red and blue lights are overlapped with each other on the screen.

Preferably, in the liquid crystal projector device according to the present invention, the size of the image produced by the red light of the red and blue lights having been modulated by the liquid crystal element for red and blue lights is accorded with those of the images of the first and second green lights having been modulated by the first and second liquid crystal elements.

Since the human's sensibility to the image produced by a blue light is weak, when size of the image produced by a red light is accorded with that produced by a green image, the pixels of these colors are seemed to be the same size.

DESCRIPTION OF THE PREFERRED EMBODIMENTS

Figure 1:
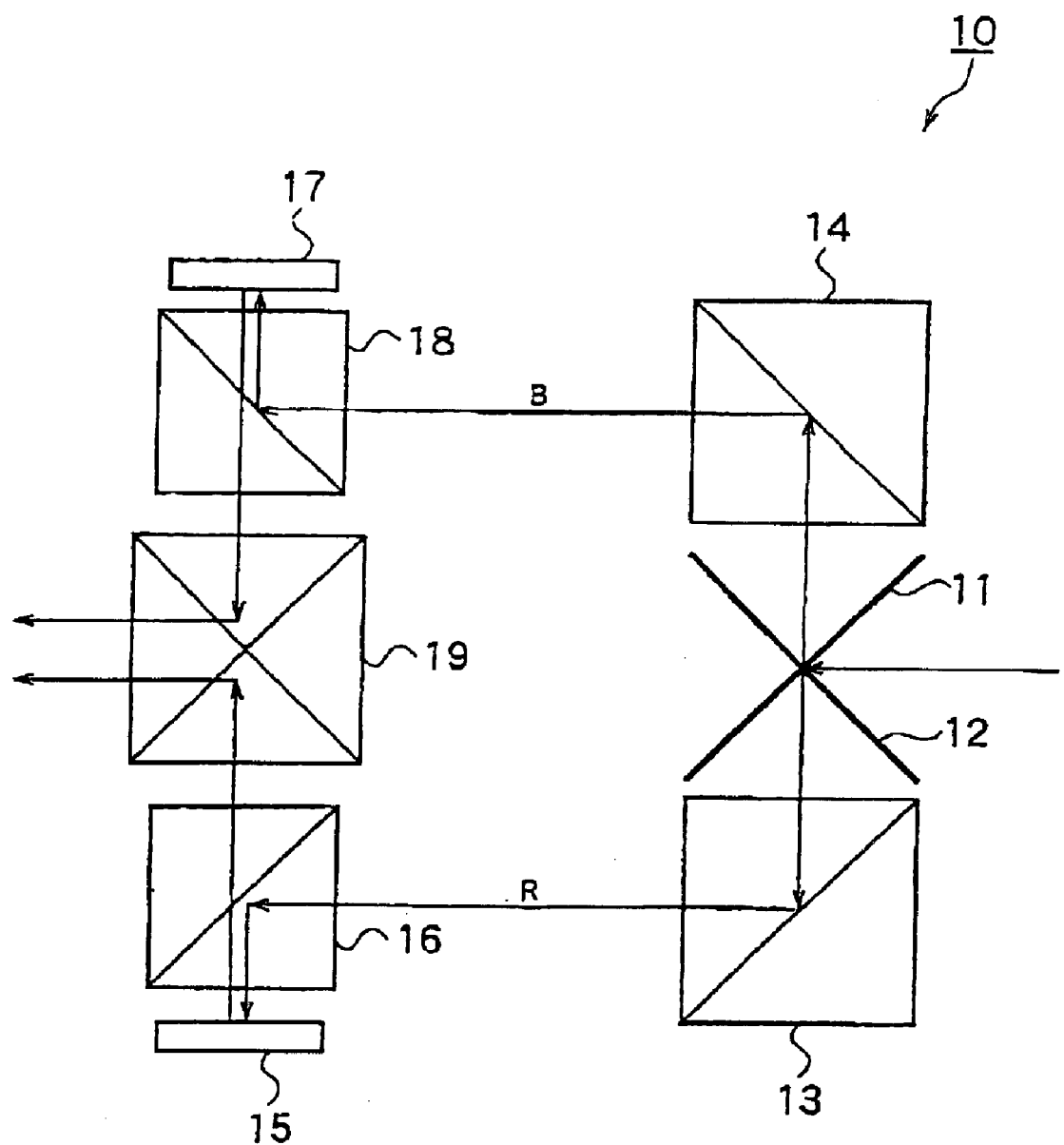
FIG. 1 schematically shows constructions of a unit for red light and blue light in the liquid crystal projector device.

Embodiments of the liquid crystal projector device according to the present invention will now be described by referring to the drawings.

The liquid crystal projector device in this embodiment is composed of units for modulating a red (R) light, a green (G) light, and a blue (B) light. In the following description, first of all, a unit for red light and blue light, which modulates a red light and a blue light, will be described and then, a unit for green light, which modulates a green light, will be described.

FIG. 1 schematically shows constructions of a unit 10 for red light and blue light in the liquid crystal projector device.

The unit 10 for red light and blue light possesses a dichroic mirror 11 for red light and a dichroic mirror 12 for blue light, arranged so that they are arranged to be crossing with each other to be in an X form and in which a white light enters therein, and possesses a first pre-polarization beam splitter (PBS) 13 in which a red light enters from the dichroic mirror 11 for red light, and a second pre-polarization beam splitter 14 in which a blue light enters from the dichroic mirror 12 for blue light.

The unit 10 for red light and blue light also possesses a reflecting type liquid crystal element 15 for red light, which modulates a red light, and a polarization beam splitter 16 for red light, which reflects the red light entering from the first pre-polarization beam splitter 13 to allow it for entering the reflecting type liquid crystal element 15 for red light, and which transmits the red light having been modulated by the reflecting type liquid crystal element 15 for red light.

The unit 10 for red light and blue light also possesses a reflecting type liquid crystal element 17 for blue light, which modulates a blue light, and a polarization beam splitter 18 for blue light, which reflects the blue light entering from the second pre-polarization beam splitter 14 to allow it for entering the reflecting type liquid crystal element 17 for blue light, and which transmits the blue light having been modulated by the reflecting type liquid crystal element 17 for blue light.

Moreover, the unit 10 for red light and blue light possesses a cross dichroic prism 19, which reflects the red light entering from the polarization beam splitter 16 for red light and the blue light entering from the polarization beam splitter 18 for blue light in the same direction, whereby these lights are combined.

As for the white light, which enters the dichroic mirror 11 for red light and the dichroic mirror 12 for blue light crossing in an X form, the red light is reflected at the dichroic mirror 11, for red light, the blue light is reflected at the dichroic mirror 12 for blue light in the reverse direction, and the green light is transmitted.

The red light reflected at the dichroic mirror 12 for blue light enters the first pre-polarization beam splitter 13, at which a prescribed polarized light is reflected. The red light reflected at the first pre-polarization beam splitter 13 enters the polarization beam splitter 16 for red light, is then reflected and enters the reflecting type liquid crystal element 15 for red light at which it is modulated. The red light having been modulated by the reflecting type liquid crystal element 15 for red light enters the cross dichroic prism 19 and is then reflected.

The blue light reflected at the dichroic mirror 11 for red light enters second pre-polarization beam splitter 14, at which a prescribed polarized light is reflected. The blue light reflected at the second pre-polarization beam splitter 12 enters the polarization beam splitter 18 for blue light, is then reflected and enter the reflecting type liquid crystal element 17 for blue light at which it is modulated. The blue light having been modulated in the reflecting type liquid crystal element 17 for blue light enters the cross dichroic prism 19 and is then reflected.

Figure 2:
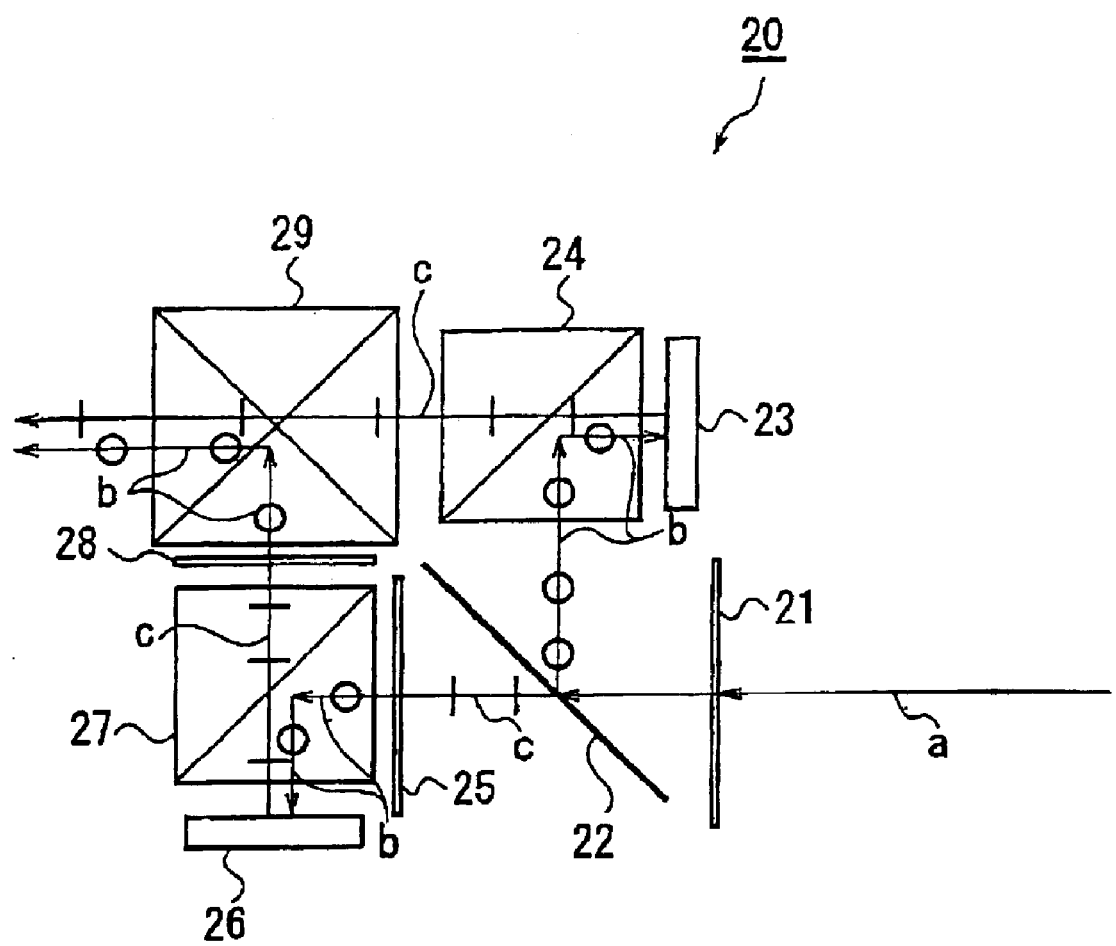
FIG. 2 schematically shows a construction of a unit for green light in the liquid crystal projector device.

FIG. 2 schematically shows a construction of a green light unit 20 in the liquid crystal projector device.

In this figure, a beam "a" indicates a white light, a beam "b" indicates an S wave, and a beam "c" indicates a P wave, respectively.

The green light unit 20 possesses a dichroic mirror 21 for green light, a first polarization beam splitter 22 in the form of a plate, in which the green light transmitted through the dichroic mirror 21 for green light enters, and which separates the green light into a first and second green light perpendicular to each other, a reflecting type liquid crystal element 23 for first green light, which modulates the first green light, and a second polarization beam splitter 24, in which the first green light from the first polarization beam splitter 22 and the first green light from the reflecting type liquid crystal element 23 for first green light enter.

It should be noted that the first polarization beam splitter 22 in this embodiment is in the form of a plate, but a polarization beam splitter comprising a cubic glass block may also be used.

The green light unit 20 possesses a first half-wave plate 25, which revolves the polarized plane of the second green light from the first polarization beam splitter 22 at 90 degree, a second reflecting type liquid crystal element 26 for second green light, which modulates the second green light, a third polarization beam splitter 27, in which the second green light from the first half-wave plate 25 and the second green light from the second reflecting type liquid crystal element 26 for second green light enter, a second half-wave plate 28, which revolves the polarized plane of the second green light from the second polarization beam splitter 27 at 90 degree, and a fourth polarization beam splitter 29, in which the first green light from the second polarization beam splitter 24 and the second green light from the third polarization beam splitter and the second half-wave plate 28 enters and these lights are combined.

The non-polarized white light inputted into the green light unit 20 enters the dichroic mirror 21 for green light, through which only the green light is transmitted. The green light having been transmitted through the dichroic mirror 21 for green light enters the polarization beam splitter 22 in the form of a plate where the S wave is reflected as the first green light, the P wave is transmitted as the second green light to separate the wave plane. The first green light of the S wave reflected at the first polarization beam splitter 22 enters the second polarization beam splitter 24, and then is reflected. The first green light of the S wave reflected at the second polarization beam splitter 24 enters the first reflecting type liquid crystal element 23 for green light to be a modulated P wave. The first green light of the P wave having being modulated by the first reflecting type liquid crystal element 23 for green light enters the, second polarization beam splitter 24 and is transmitted. The first green light of the P wave transmitted through the second polarization beam splitter 24 enters the fourth polarization beam splitter 29, and is transmitted.

The second green light of the P wave having been transmitted through the first beam splitter 22 enter the first half-wave plate 25, and is converted into the S wave. The second green light of the P wave converted at the first half-wave plate 25 enters the third polarization beam splitter 27, and is reflected. The second green light of the S wave reflected at the third polarization beam splitter 27 enters the second reflecting type liquid crystal element 26 for second green light to be a modulated P wave. The second green light of the P wave having been modulated at the second reflecting type liquid crystal element 26 for second green light enters the third polarization beam splitter 27, and is transmitted. The second green light of the P wave transmitted through the third polarization beam splitter 27 enters the second half-wave plate 28, and is converted into an S wave. The second green light of the S wave converted at the second half-wave plate 28 enters the fourth polarization beam splitter 29, and is reflected.

The first and second green lights injected from the fourth polarization beam splitter 29 are projected together with the red light and the blue light projected from the cross dichroic prism 19 of the unit 10 for red light and blue light as described above on a screen (not shown). On the screen, the images from the first green light having been modulated by the reflecting type liquid crystal element 23 for first green light and from the second green light having been modulated by the reflecting type liquid crystal element 26 for second green light are combined.

Next, for the purpose of being compared with this embodiment, a dual G system projector device realized by adding, to a usual liquid crystal projector device using a reflecting type liquid crystal element, an additional liquid crystal element for green light will be described as a comparative embodiment.

Figure 5:
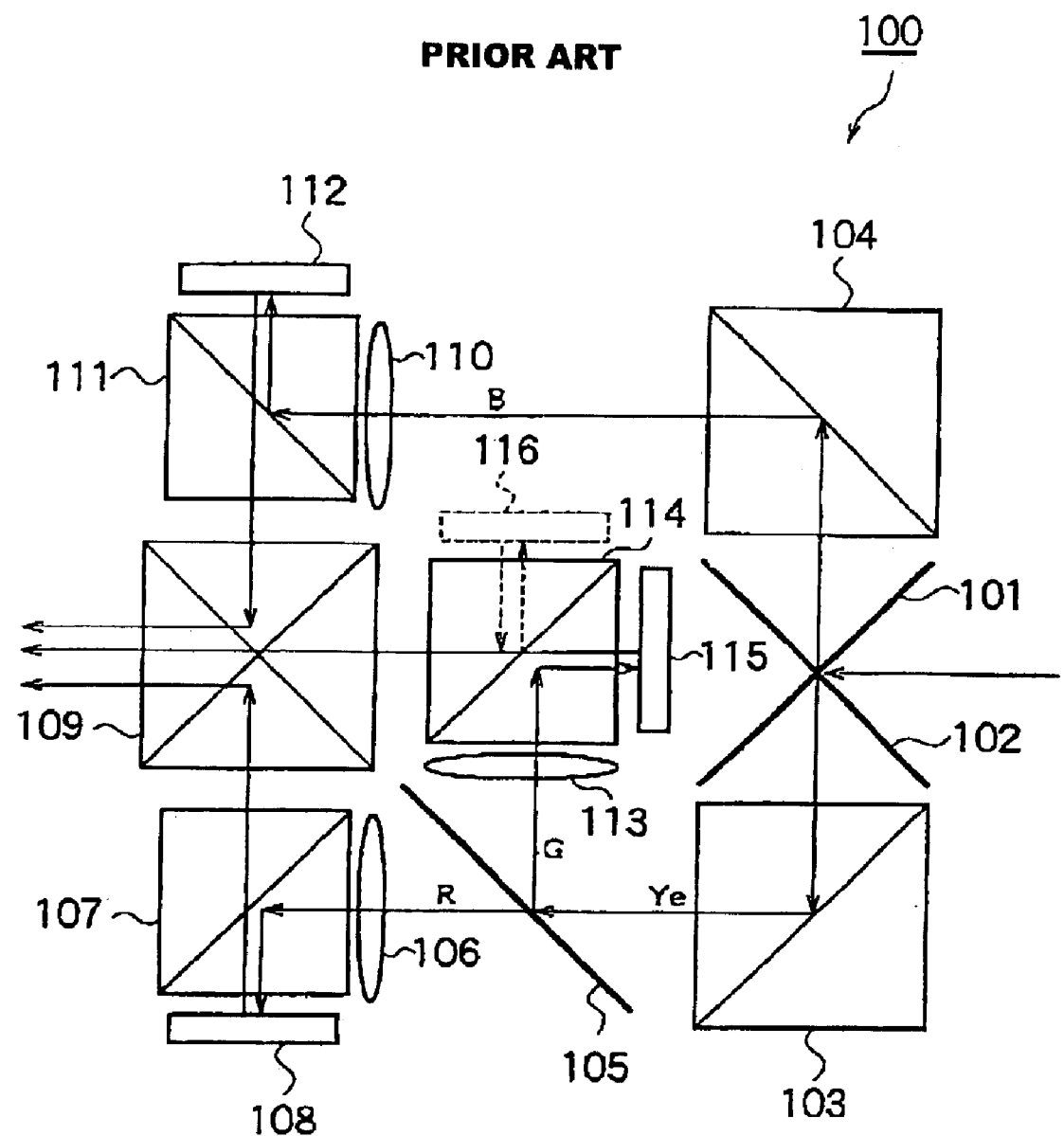
FIG. 5 schematically shows a construction of a comparative liquid crystal projector device.

FIG. 5 schematically shows a construction of a comparative liquid crystal projector device 100.

First, the operation before the additional green liquid crystal element is added will be described.

Amongst the white light entering the comparative projector device 100, the red (R) light and the green (G) light are reflected by a dichroic mirror 101 for red and green, enter a first pre-polarization beam splitter 103, and are then reflected. Here, the red light and green light are duplicated to be a yellow (Ye) light.

The red light and green light having been reflected at the first pre-polarization beam splitter 103 enter a dichroic mirror 105 for green, at which the green light is reflected and the red light is transmitted.

The red light having been transmitted through the dichroic mirror 105 for green enters a polarization beam splitter 107 for red light via a first field lens 106, and is reflected to enter a reflecting type liquid crystal element 108 for red light, and is then modulated. The red light having been modulated by the reflecting type liquid crystal element 108 for red light is transmitted through the polarization beam splitter 107 for red light, enters the cross dichroic prism 109, and is then reflected.

The green light reflected at the dichroic mirror 105 for green enters a polarization beam splitter 114 for green light via a second field lens 113, is reflected, enters a reflecting type liquid crystal element 115 for green light, and is then reflected.

Amongst the white light entering the comparative projector device 100, the blue (B) light is reflected by a dichroic mirror 102 for blue light, enters a second pre-polarization beam splitter 104, and is then reflected. The blue light having being reflected at the second pre-polarization beam splitter 104 enters a polarization beam splitter 111 for blue light via a third field lens, it is reflected to enter a reflecting type liquid crystal element 112 for blue light, at which it is modulated. The blue light having been modulated by the reflecting type liquid crystal element 112 for blue light is transmitted through the a polarization beam splitter 111 for blue light, and enters the cross dichroic prism 109, at which it is reflected.

As described above, in the projector device 100, the white light enters, and then the red light having been modulated by the reflecting type liquid crystal element 108 for red light, the green light having been modulated by the reflecting type liquid crystal element 115 for green light, and the blue light having been modulated by the reflecting type liquid crystal element 112 for blue light are injected. The red light, the green light, and the blue light are projected by the same projection lens on a screen.

By adding the additional liquid crystal element 116 to the comparative projector device 100 having the construction as described above, a dual G system can be realized.

In this case, amongst the green light entering the polarization beam splitter 114 for green light, the S wave is reflected to enter the reflecting type liquid crystal element 115 for green light, and the P wave is transmitted to enter an additional reflecting type liquid crystal element 116. The S wave entering reflecting type liquid crystal element 115 for green light becomes a modulated P wave, which is transmitted through the polarization beam splitter 114 for green light. The P wave entering the additional reflecting type liquid crystal element 116 for green light becomes an S wave, which is reflected at the polarization beam splitter 114 for green light. The S wave and the P wave making up the green light enter the cross dichroic prism 109.

The green light transmitted through the cross dichroic prism 109 is projected by the same projection lens. On the screen, the green lights having been modulated by the liquid crystal elements for first and second green lights correspond to the green images, which are shifted to half pitch with each other.

However, in the case of such an additional reflecting type liquid crystal element 116 for green light, no sufficient performance for polarization and separation in the polarization beam splitter 114 for green light can be obtained. Consequently, the image projected from the additional reflecting type liquid crystal element cannot have a sufficient contrast ratio.

In comparison with the comparative liquid crystal projector device 100, in the liquid crystal projector device in this embodiment, sufficient contrast ratios can be given both to the first and second green light. Specifically, in the green light unit 20 according to this embodiment, since sufficient performance for polarization, separation and transmission can be exhibited both for the first and second green lights, sufficient contrast ratios can be obtained in both green lights.

Figure 3:
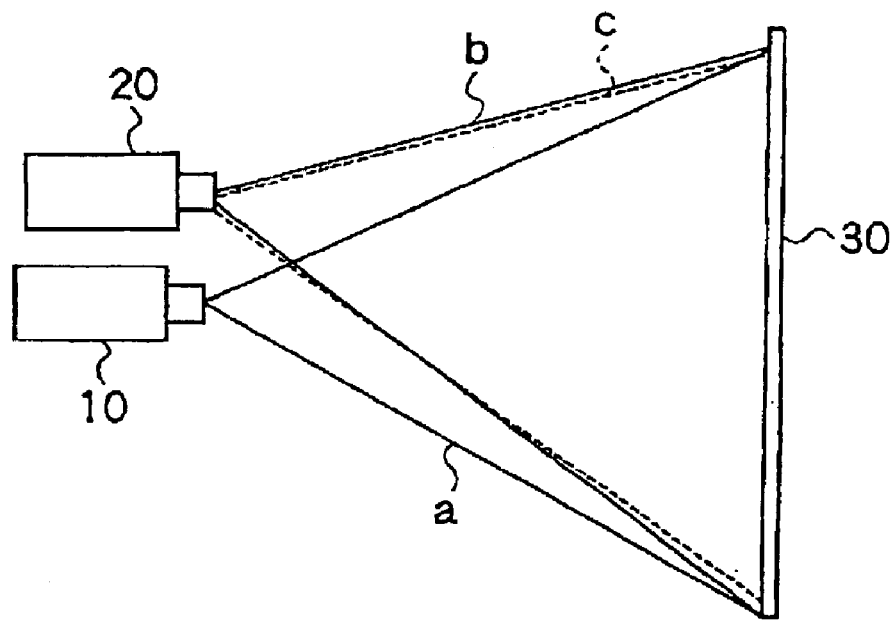
FIG. 3 is a drawing showing the projection of the images from the liquid crystal projector device to the screen.

FIG. 3 shows projection of the image from the liquid crystal projector device to the screen.

The liquid crystal projector device according to this embodiment is composed of the unit 10 for red light and blue light, which projects a red light and a blue light, and the green light unit 20, which projects a green light.

The images produced by the red light and blue light a projected by the unit 10 for red light and blue light and the images produced by green lights b and c projected by the unit 20 for green light are in the same position on the screen 30.

Here, it is configured that the red light of the red light and blue light "a" and green lights "b" and "c" are accorded with each other in size. Whereas the images produced by a red light and a blue light have a different size with each other at the time of the projection due to the magnification chromic aberration of the projection lens as a rule, since a blue image is less sensitive for human, it may be configured that the size of the red image may be accorded with the size of the green image.

Figure 4:
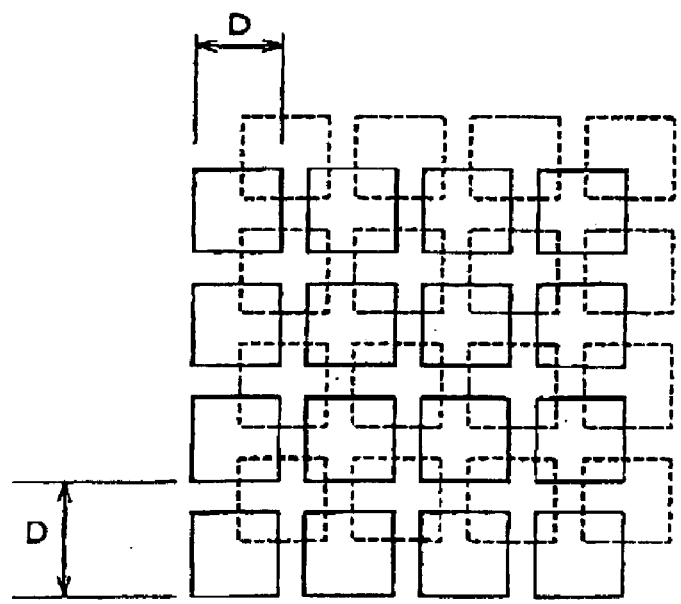
FIG. 4 shows an arrangement of the first and second green pixels.

FIG. 4 shows an arrangement of the first and second green light on the screen.

The green light projected by the green light unit 20 is composed-of the first green light b having been modulated by the reflecting type liquid crystal element 23 for first green light and the second green light having been modulated by the reflecting type liquid crystal element 26 for first green light.

The first green image (depicted as a real line in the figure) produced by the first green light "b" and the second green image (depicted as a broken line in the figure) produced by the second green light "c" are arranged to be overlapped with each other at the position where they are shifted to half pixel pitch D, i.e., ½ pitch of the minimum pixel unit.

Since the human sensitivity is the best at the green light within the visible light, when the green pixels are arranged in such a manner that they are shifted to half pixel pitch, the image can be highly precise.

The embodiments described above are only by way of the exemplification and the present invention is not restricted thereto. For example, although the unit 10 for red light and blue light and the unit 20 for green light in the embodiment shown in FIG. 3 as described above are separately composed, they may be unified.

As described above, a liquid crystal projector device, which is high resolution, has decreased magnification chromic aberration and a sufficient contrast ratio can be provided.

What is claimed is:

1. A liquid crystal projector device, which projects an image having been modulated with a liquid crystal element on a screen, comprising:

first to fourth polarization bean splitters;

first and second half-wave plates; and first and second liquid crystal elements, said first polarization beam splitter separating a green light entering therein into a first and second green lights perpendicular to each other, said first liquid crystal element modulating the first green light, said second polarization beam splitter reflecting the first green light having been separated by the first polarization beam splitter to be directed to the first liquid crystal element, and transmitting the first green light having been modulated by the first liquid crystal element, said first half-wave plate revolving the polarization plane of the second green light separated by the first polarization beam splitter at 90 degree, said second liquid crystal element modulating the second green light, said third polarization beam splitter reflecting the second green light from the first half-wave plate to be directed to the second liquid crystal element and transmitting the second green light having been modulated by the second liquid crystal elements, said second half-wave plate revolving the polarization plane of the second green light transmitted through the third polarization beam splitter at 90 degree, and said fourth polarization beam splitter transmitting the first green light having been transmitted through the second polarization beam splitter, and reflecting the second green light from the second half wave-plate, wherein said first and second liquid crystal elements correspond to the green pixels arranged so as to be shifted with each other in the horizontal direction, or in the vertical direction, or in both the horizontal and vertical directions, displayed on the screen for projecting the image.

2. The liquid crystal projector device according claim 1, wherein said first and second liquid crystal elements are reflecting type liquid crystal elements.

3. The liquid crystal projector device according to claim 1, wherein said first polarization beam splitter is in a plate form or comprises a cubic glass block.

4. A liquid crystal projector device, which projects an image having been modulated with a liquid crystal element on a screen, comprising:

first to fourth polarization beam slitters;

first and second half-wave plates; and first and second liquid crystal elements, said first polarization beam splitter separating a green light entering therein into a first and second green lights perpendicular to each other, said first liquid crystal element modulating the first green light, said second polarization beam splitter reflecting the first green light having been separated by the first polarization beam splitter to be directed to the first liquid crystal element, and transmitting the first green light having been modulated by the first liquid crystal element, said first half-wave plate revolving the polarization plane of the second green light separated by the first polarization beam splitter at 90 degree said second liquid crystal element modulating the second green light said third polarization beam splitter reflecting the second green light from the first half-wave plate to be directed to the second liquid crystal element and transmitting the second green light having been modulated by the second liquid crystal element, said second half-wave plate revolving the polarization plane of the second green light transmitted through the third polarization beam splitter at 90 degree, and said fourth polarization beam splitter transmitting the first green light having been transmitted through the second polarization beam splitter, and reflecting the second green light from the second half wave-plate, wherein said first and second liquid crystal elements correspond to the green pixels arranged so as to be shifted to half pixel pitch with each other in the horizontal direction and/or the vertical direction displayed on the screen for projecting the image.

5. The liquid crystal projector device according to claim 4, which has a liquid crystal element for red and blue lights, which modulates a red light and a blue light, respectively, and wherein said first and second green lights having been modulated by the first and second liquid crystal elements and the red and blue lights having been modulated by the liquid crystal element for red and blue lights are overlapped with each other on the screen.

6. The liquid crystal projector device according to claim 5, wherein the size of the image produced by the red light of the red and blue lights having been modulated by the liquid crystal element for red and blue lights is accorded with those of the images of the first and second green lights having been modulated by the first and second liquid crystal elements.

* * * * *